JAMES W. WILDER AND ASA B. STOW, OF MIDDLETOWN, CONNECTICUT.

Letters Patent No. 87,996, dated March 16, 1869.

IMPROVED PROCESS OF PREPARING ARTICLES OF GOLD, SILVER, GLASS, &c., TO ENABLE THE SAME TO BE PHOTOGRAPHED.

The Schedule referred to in these Letters Patent and making part of the same.

*To all whom it may concern:*

Be it known that we, JAMES W. WILDER and ASA B. STOW, both of Middletown, in the county of Middlesex, and State of Connecticut, have invented a new and improved Process or Method of Preparing Gold, Silver, Glass, Earthen and other Ware, and Burnished and Polished Surfaces, so as to Enable the Same to be Sharply and Clearly Photographed; and we do hereby declare that the following is a full, clear, and exact description of the same.

It is customary for manufacturers of and dealers in gold and silver, and fine glass and earthenwares, to exhibit the same by photographic representations thereof. Much difficulty is experienced in obtaining clear or sharp pictures, and it is found that it is almost if not quite impossible to obtain a good photograph of polished metal wares; and hence such as are obtained are taken before the article is polished.

By our method of preparing wares and burnished and polished surfaces for photographing, clear and sharp photographs of the same may be quickly obtained. To this end, therefore, Our invention consists in coating, or partially coating, the article, by subjecting the same to the vapor or fumes of such chemicals as will leave a suitable sublimate upon the same.

In carrying out our invention, we find it advisable to proceed as follows:

We first wipe the article thoroughly dry, and remove from it all finger-marks, &c. We then, for convenience, take a plate of metal, and heat it sufficiently hot. A red heat would answer for ordinary purposes, though the degree of heat should be determined, in view of the article being treated; and we will remark that any other properly-heated surface would answer; and on this plate we sprinkle, say, with a fine sieve, pulverized muriate of ammonia, say eighty parts, and pulverized resin, say twenty parts. The proportions may, however, be varied, to suit the article which it is intended to photograph. For instance, if we desire a lighter or darker color, we use more or less resin; and we find it desirable to often vary the color, as some wares require to be of a darker or lighter color to photograph well. The article is held over this plate, so that the vapor will properly settle upon and form a sublimate on the same.

When the article to be treated has engraved or etched lines or figures upon it, in which case it is desirable to bring such lines out clearly in the picture, we find it expedient to first fill the incisions with some suitable opaque substance—a dry pigment, or paint, for instance, such as Vandyke brown. The surface is then wiped off clean, and the article submitted to the vapor, as before.

When the article to be treated contains figures or designs in relief, we find it expedient to apply some of the opaque substance at such places where it is desirable to produce shade in the picture, in order to bring the figures or design out sharply. For instance, we apply it along the lines where the figures join the surface from which they protrude.

We wish it understood that we do not limit our invention to the use of the chemical agents herein named, as it is obvious that there are many chemicals which can be reduced to a vapor or fume, which, being caught upon the article, will sublimate, and form a coating clearly within and answering the purposes of our invention.

By our method of preparing gold, silver, glass, earthen and other wares, and polished surfaces, to enable the same to be properly represented by photography, we supply a desideratum long felt.

As we have before stated, it has been almost if not quite impossible for photographers to obtain even passable photographs of polished wares, and, therefore, photographs of the wares have been taken before the articles were polished. Even in this latter case, they are not as clear and distinct as desirable, and much time and many trials are required to get the imperfect ones that are obtained.

By our method of preparing the articles, photographs of the same can be quickly taken, and the pictures are clear, sharp, and distinct.

What we claim as our invention, and desire to secure by Letters Patent, is—

The method or process of preparing gold, silver, glass, and earthen and other wares, and burnished and polished surfaces, so as to obtain clear and sharp photographs of the same, substantially as herein specified.

JAMES W. WILDER.
ASA B. STOW.

Witnesses:
R. BROATCH,
I. McDONNELL.